United States Patent
Wu et al.

(10) Patent No.: US 8,867,001 B2
(45) Date of Patent: Oct. 21, 2014

(54) PATTERNED RETARDATION FILM COMPRISING RELIEF-LIKE STRIPE STRUCTURES AND SUB MICRON GROOVES

(75) Inventors: Fung-Hsu Wu, Gueishan Township, Taoyuan County (TW); Lung-Hai Wu, Taoyuan (TW)

(73) Assignee: Benq Materials Corp., Gueishan Township, Taoyuan County (TW)

(*) Notice: Subject to any disclaimer, the term of this patent is extended or adjusted under 35 U.S.C. 154(b) by 537 days.

(21) Appl. No.: 13/281,765

(22) Filed: Oct. 26, 2011

(65) Prior Publication Data

US 2012/0314181 A1 Dec. 13, 2012

(30) Foreign Application Priority Data

Jun. 13, 2011 (TW) .............................. 100120610 A

(51) Int. Cl.
| | | |
|---|---|---|
| *G02F 1/1335* | (2006.01) | |
| *C09K 19/02* | (2006.01) | |
| *G02F 1/13363* | (2006.01) | |
| *G02B 5/30* | (2006.01) | |
| *G02B 27/26* | (2006.01) | |

(52) U.S. Cl.
CPC .......... *G02B 5/3083* (2013.01); *G02F 1/13363* (2013.01); *G02F 2001/133631* (2013.01); *G02B 27/26* (2013.01)
USPC .......................................... 349/117; 349/181

(58) Field of Classification Search
USPC ................................. 349/117, 181
See application file for complete search history.

(56) References Cited

U.S. PATENT DOCUMENTS

| | | | |
|---|---|---|---|
| 3,735,615 A | 5/1973 | Shneider | |
| 5,663,802 A | 9/1997 | Beckett et al. | |
| 7,510,462 B2 | 3/2009 | Bryan et al. | |
| 7,714,945 B2 | 5/2010 | Tan et al. | |
| 7,969,541 B2 | 6/2011 | Okuyama et al. | |
| 8,413,557 B2 | 4/2013 | Akiyama et al. | |
| 2010/0073604 A1* | 3/2010 | Okuyama et al. ............... | 349/75 |

FOREIGN PATENT DOCUMENTS

| | | |
|---|---|---|
| CN | 1928632 A | 3/2007 |
| CN | 101861535 A | 10/2010 |
| JP | 2008272925 A | 11/2008 |

(Continued)

OTHER PUBLICATIONS

English Abstract translation of JP2008272925 (Published Nov. 13, 2008).
TW Office Action dated May 23, 2013.
English language translation of abstract of TW I283324 (published Jul. 1, 2007).
TW Office Action dated May 12, 2013.
TW Office Action dated Mar. 24, 2014.

(Continued)

*Primary Examiner* — Paul Lee
(74) *Attorney, Agent, or Firm* — McClure, Qualey & Rodack, LLP

(57) ABSTRACT

A patterned retardation film including a base substrate, a patterned resin layer and a liquid crystal layer is provided. The patterned resin layer having plurality of first areas and a plurality of second areas is disposed on the base substrate. The combination of the first and second areas is a grating-like stripe structure. The patterned resin layer includes an aligning micron structure. The aligning micron structure includes a plurality of first sub micron grooves and a plurality of second sub micron grooves respectively located in the first areas and the second areas. The liquid crystal layer is disposed on the patterned resin layer and aligned with the aligning micron structure. The liquid crystal layer disposed above the first areas provides a first phase retardation. The liquid crystal layer disposed above the second areas provides a second phase retardation.

9 Claims, 3 Drawing Sheets

(56) References Cited

FOREIGN PATENT DOCUMENTS

| JP | 2010169951 A | 8/2010 |
| TW | I283324 | 7/2007 |
| WO | 2011049326 A2 | 4/2011 |

OTHER PUBLICATIONS

English Abstract translation of JP2010169951 (Published Aug. 5, 2010).

Non-Final Office Action issued in U.S. Appl. No. 13/314,320, filed Dec. 8, 2011, mailed Aug. 14, 2014.

* cited by examiner

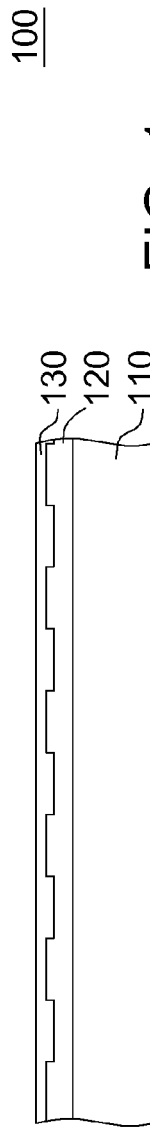
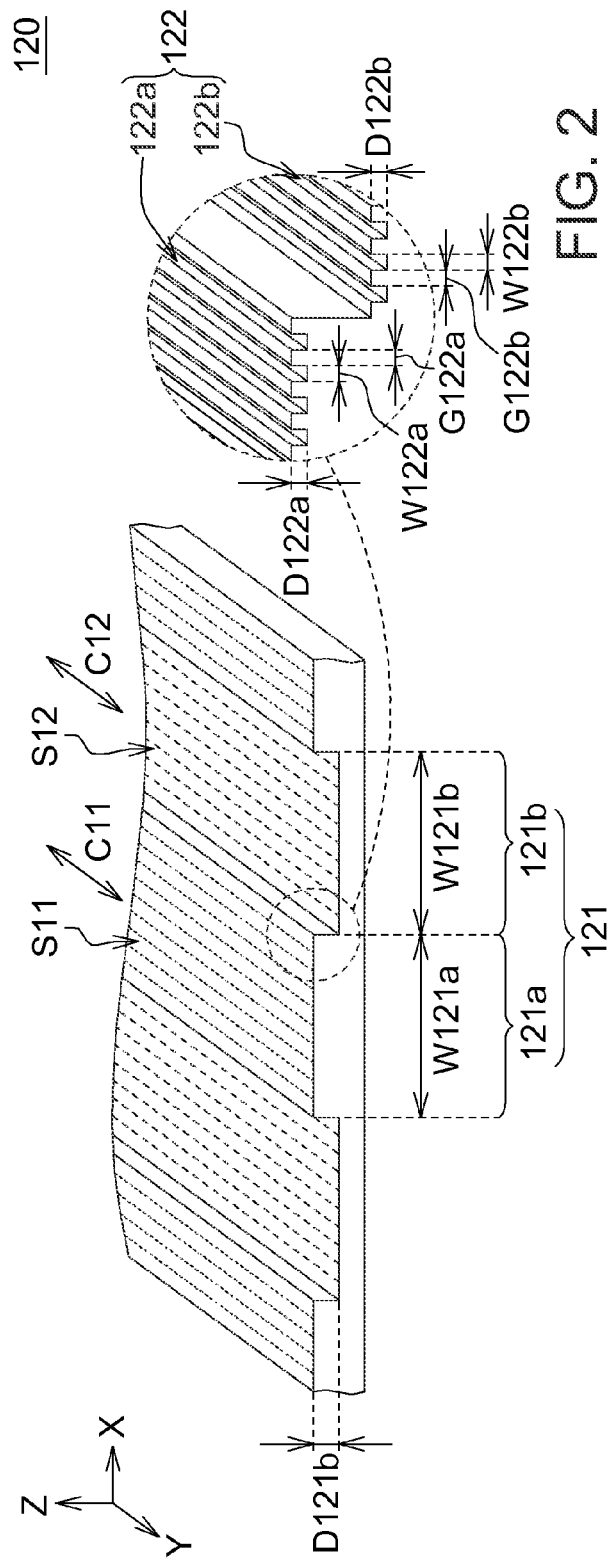
FIG. 1
FIG. 2

PATTERNED RETARDATION FILM COMPRISING RELIEF-LIKE STRIPE STRUCTURES AND SUB MICRON GROOVES

This application claims the benefit of Taiwan application Serial No. 100120610, filed Jun. 13, 2011, the subject matter of which is incorporated herein by reference.

BACKGROUND OF THE INVENTION

1. Field of the Invention

The invention relates in general to a patterned retardation film, and more particularly to a patterned retardation film having at least one phase retardation.

2. Description of the Related Art

Along the advance in the display technology, a patterned retardation film is provided accordingly. Different optical phase retardations can be generated through the use of the patterned retardation film, so as to generate stereo visual effect. The patterned retardation film can be used in the 3D display technology such as stereo display glasses, stereo display TV and so on.

The patterned retardation film makes the liquid crystal molecules generate different alignment effects through the design of micro pattern, and can further make the liquid crystal molecules generate different phase retardation effects in different areas through the design of the thickness in different areas.

The micro pattern of the patterned retardation film is a crucial factor for optical effects. For the patterned retardation film to achieve wider application, the industries have invested considerable amounts of capital and equipment in various designs of the patterned retardation film so that the 3D display technology can advance further.

SUMMARY OF THE INVENTION

The invention is directed to a patterned retardation film. The grating-like stripe structure and relief-like stripe structure of the patterned resin layer make the liquid crystal layer generate different phase retardations, which can further be applied in the 3D display technology.

According to an aspect of the present invention, a patterned retardation film including a base substrate, a patterned resin layer and a liquid crystal layer is provided. The patterned resin layer having a plurality of first areas and a plurality of second areas is disposed on the base substrate. The combination of the first and second areas is a grating-like stripe structure, and the first areas are a relief-like stripe structure, wherein the first areas are substantially interlaced and parallel to the second areas. The patterned resin layer includes an aligning micron structure. The aligning micron structure is disposed on a surface of the patterned resin layer. The aligning micron structure includes a plurality of first sub micron grooves and a plurality of second sub micron grooves. The first sub micron grooves are formed on a top surface of each first area. The first sub micron grooves are substantially parallel to a first extension direction of the first areas. The second sub micron grooves are formed on a bottom surface of each second area. The second sub micron grooves are substantially parallel to a second extension direction of the second areas. The liquid crystal layer is disposed on the patterned resin layer and aligned with the aligning micron structure. The liquid crystal layer disposed above the first areas provides a first phase retardation. The liquid crystal layer disposed above the second areas provides a second phase retardation.

According to another aspect of the present invention, a patterned retardation film including a base substrate, a patterned resin layer and a liquid crystal layer is provided. The patterned resin layer having a plurality of first areas and a plurality of second areas is disposed on the base substrate. The combination of the first and second areas is a grating-like stripe structure, and the first areas are a relief-like stripe structure, wherein the first areas are substantially interlaced and parallel to the second areas. The patterned resin layer includes an aligning micron structure. The aligning micron structure is disposed on a surface of the patterned resin layer. The aligning micron structure includes a plurality of first sub micron grooves and a plurality of second sub micron grooves. The first sub micron grooves are formed on a top surface of each first area. The first sub micron grooves are substantially parallel to a first extension direction of the first areas. The second sub micron grooves are formed on a bottom surface of each second area. The second sub micron grooves and a second extension direction of the second areas substantially form a 45° angle. The liquid crystal layer is disposed on the patterned resin layer and aligned with the aligning micron structure. The liquid crystal layer disposed above the first areas provides a first phase retardation. The liquid crystal layer disposed above the second areas provides a second phase retardation.

According to yet another aspect of the present invention, a patterned retardation film including a base substrate, the patterned resin layer and a liquid crystal layer is provided. The patterned resin layer having a plurality of first areas and a plurality of second areas is disposed on the base substrate. The combination of the first and second areas is a grating-like stripe structure, and the first areas are a relief-like stripe structure, wherein the first areas are substantially interlaced and parallel to the second areas. The patterned resin layer includes an aligning micron structure. The aligning micron structure is disposed on a surface of the patterned resin layer. The aligning micron structure includes a plurality of first sub micron grooves and a plurality of second sub micron grooves. The first sub micron grooves are formed on a top surface of each first area. The first sub micron grooves are substantially parallel to a first extension direction of the first areas. The second sub micron grooves are formed on a bottom surface of each second area. The second sub micron grooves are substantially interlaced and vertical to a second extension direction of the second areas. The liquid crystal layer is disposed on the patterned resin layer and aligned with the aligning micron structure. The liquid crystal layer disposed above the first areas provides a first phase retardation. The liquid crystal layer disposed above the second areas provides a second phase retardation.

The above and other aspects of the invention will become better understood with regard to the following detailed description of the preferred but non-limiting embodiment (s). The following description is made with reference to the accompanying drawings.

BRIEF DESCRIPTION OF THE DRAWINGS

FIG. 1 shows a schematic diagram of a patterned retardation film of a first embodiment;

FIG. 2 shows a 3D diagram of the patterned resin layer of FIG. 1;

DETAILED DESCRIPTION OF THE INVENTION

Figure 3:
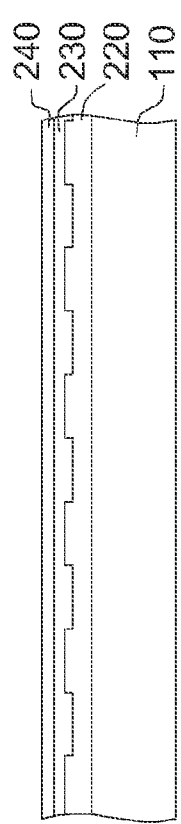
FIG. 3 shows a schematic diagram of a patterned retardation film of a second embodiment.

Various embodiments of the patterned retardation film are disclosed below for detailed descriptions of the invention. The grating-like stripe structure and the relief-like stripe structure of the patterned resin layer make the liquid crystal layer generate different phase retardations, which can further be applied in the 3D display technology. However, the embodiments are for exemplification purpose only, not for limiting the scope of protection of the invention. In addition, in the embodiments, a part of the elements are omitted to highlight the technical features of the invention.

First Embodiment

Referring to FIG. 1, a schematic diagram of a patterned retardation film 100 of a first embodiment is shown. The patterned retardation film 100 includes a base substrate 110, a patterned resin layer 120 and a liquid crystal layer 130. The base substrate 110 is a transparent flexible substrate formed by materials such as polyethylene terephthalate (PET), polycarbonate (PC), triacetyl cellulose (TAC), polymethyl methacrylate (PMMA) and cyclo-olefin polymer (COP). The thickness of the base substrate 110 ranges from 30 to 300 μm. The patterned resin layer 120 is disposed on the base substrate 110. The patterned resin layer 120 is a transparent resin. The liquid crystal layer 130 is disposed on the patterned resin layer 120. The liquid crystal layer 130 such as includes a liquid crystal material. In the present embodiment of the invention, the liquid crystal layer 130 is already solidified, and the alignment direction of the internal liquid crystal molecules is fixed. When the light passes through the liquid crystal layer 130, phase retardation will occur.

Referring to FIG. 2, a 3D diagram of the patterned resin layer 120 of FIG. 1 is shown. The patterned resin layer 120 has a plurality of first areas 121a and a plurality of second areas 121b. The first areas 121a are substantially interlaced and parallel to the second areas 121b, and extended towards the Y-axis direction. The combination of the first areas 121a and the second areas 121b is a grating-like stripe structure 121, wherein, the first areas 121a is a relief-like stripe structure.

The grating-like stripe structure 121 can be formed by way of roller rolling, photolithography process or laser engraving.

During the process of forming the grating-like stripe structure 121, the first areas 121a can be formed prior to the formation of the second areas 121b. Alternatively, the first areas 121a and the second areas 121b can be formed at the same time. The way of forming the grating-like stripe structure 121 is not for limiting the scope of protection of the invention, and the grating-like stripe structure 121 formed by whatever ways are within the scope of protection of the invention.

In terms of the relationship between the first areas 121a and the second areas 121b, the width W121a of each first area 121a is substantially equal to the width W121b of each second area 121b, and the width W121a of the first areas 121a and the width W121b of the second areas 121b such as range from 100 to 1000 μm. The depth D121b of each second area 121b such as ranges from 100 to 1000 μm.

As indicated in FIG. 2, the patterned resin layer 120 includes an aligning micron structure 122. The aligning micron structure 122 is disposed on a surface of the patterned resin layer 120. The aligning micron structure 122 includes a plurality of first sub micron grooves 122a and a plurality of second sub micron grooves 122b. The first sub micron grooves 122a are formed on a top surface S11 of each first area 121a. The first sub micron grooves 122a are substantially parallel to a first extension direction C11 (such as the Y-axis direction of FIG. 2) of the first areas 121a. The second sub micron grooves 122b are formed on a bottom surface S12 of each second area 121b. The second sub micron grooves 122b are substantially parallel to a second extension direction C12 (such as the Y-axis direction of FIG. 2) of the second areas 121b.

That is, the first sub micron grooves 122a and the second sub micron grooves 122b are substantially parallel to each other, and will be arranged in the same direction when the liquid crystal molecules are arranged on the first sub micron grooves 122a and the second sub micron grooves 122b.

Wherein, the first sub micron grooves 122a and the second sub micron grooves 122b of the aligning micron structure 122 can be formed by way of roller rolling, photolithography process or laser engraving.

During the process of forming the aligning micron structure 122, the first sub micron grooves 122a can be formed prior to the formation of the second sub micron grooves 122b. Alternatively, the first sub micron grooves 122a and the second sub micron grooves 122b can be formed at the same time.

The way of forming the aligning micron structure 122 is not for limiting the scope of protection of the invention, and the aligning micron structure 122 formed by whatever ways are within the scope of protection of the invention.

During the process of forming the patterned resin layer 120, the grating-like stripe structure 121 can be formed by a process with lower precision, and the aligning micron structure 122 can be formed by a process with higher precision. Alternatively, the grating-like stripe structure 121 and the aligning micron structure 122 can be formed with the same precision.

As indicated in FIG. 2, the depth D122a of each first sub micron groove 122a is substantially the same with the depth D122b of each second sub micron groove 122b. Moreover, the width W122a of each first sub micron groove 122a, the interval G122a between two adjacent first sub micron grooves 122a, the width W122b of each second sub micron groove 122b, and the interval G122b between two adjacent second sub micron grooves 122b are substantially the same. Thus, the first sub micron grooves 122a and the second sub micron grooves 122b substantially provide the same aligning capacity on the liquid crystal molecules.

Referring to FIG. 1, the liquid crystal layer 130 directly contacts the patterned resin layer 120, and is aligned with the aligning micron structure 122. When the light passes through the patterned retardation film 100, the liquid crystal layer 130 disposed above the first areas 121a provides a first phase retardation, and the liquid crystal layer 130 disposed above the second areas 121b provides a second phase retardation. The first phase retardation and the second phase retardation could be the same or not the same. Thus, the phase retardation generated by the patterned retardation film 100 can be applied in the 3D display technology.

Second Embodiment

Figure 4:
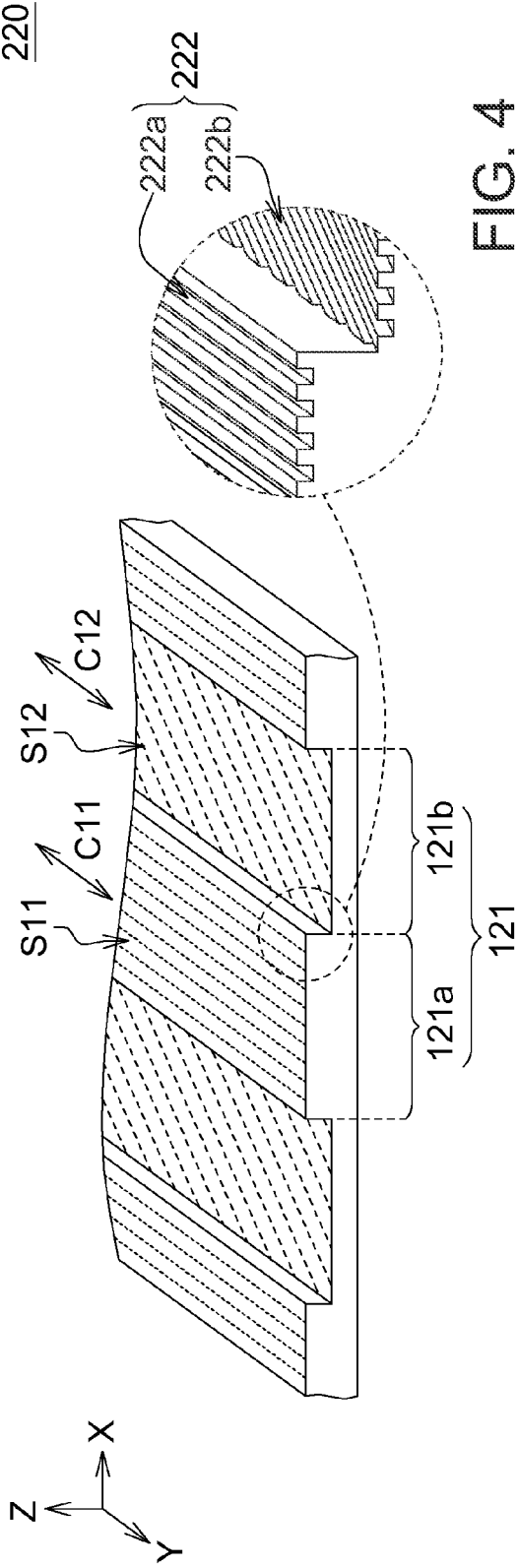
FIG. 4 shows a 3D diagram of the patterned resin layer of FIG. 3.

Referring to FIG. 3 and FIG. 4. FIG. 3 shows a schematic diagram of a patterned retardation film 200 of a second embodiment. FIG. 4 shows a 3D diagram of the patterned resin layer 220 of FIG. 3. The patterned retardation film 200 of the present embodiment of the invention is mainly different the patterned retardation film 100 of the first embodiment in the aligning micron structure 222, and other similarities are not repeated.

As indicated in FIG. 4, the aligning micron structure 222 includes a plurality of first sub micron grooves 222a and a plurality of second sub micron grooves 222b. The first sub micron grooves 222a are formed on a top surface S11 of each first area 121a. The first sub micron grooves 222a are substantially parallel to the first extension direction C11 (such as the Y-axis direction of FIG. 4) of the first areas 121a. The second sub micron grooves 222b are formed on the bottom surface S12 of each second area 121b. The second sub micron grooves 222b and the second extension direction C12 (such as the Y-axis direction of FIG. 4) of the second areas 121b substantially form a 45° angle.

That is, the first sub micron grooves 222a and the second sub micron grooves 222b substantially form a 45° angle, and the liquid crystal molecules will be arranged at a 45° angular direction when being arranged in the first sub micron grooves 222a and the second sub micron grooves 222b.

Referring to FIG. 3, the liquid crystal layer 230 directly contacts the patterned resin layer 220, and is aligned with the aligning micron structure 222. The patterned retardation film 200 of the present embodiment of the invention further includes a ¼ wavelength retardation film 240. The ¼ wavelength retardation film 240 is disposed on the liquid crystal layer 230, and the liquid crystal layer 230 such as includes a liquid crystal material. When the light passes through the patterned retardation film 200, the liquid crystal layer 230 disposed above the first areas 121a provides a first phase retardation, and the liquid crystal layer 230 disposed above the second areas 121b provides a second phase retardation. The first phase retardation and the second phase retardation could be the same or not the same. Thus, the phase retardation generated by the patterned retardation film 100 can be applied in the 3D display technology.

Third Embodiment

Figure 5:
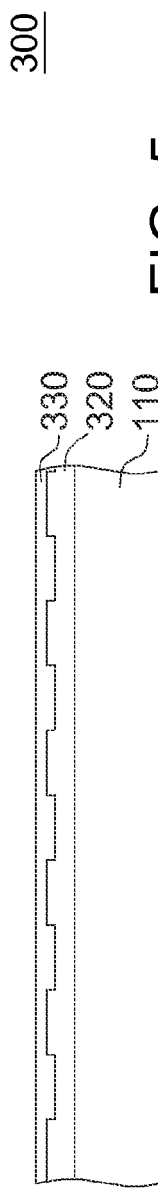
FIG. 5 shows a schematic diagram of a patterned retardation film of a third embodiment.
Figure 6:
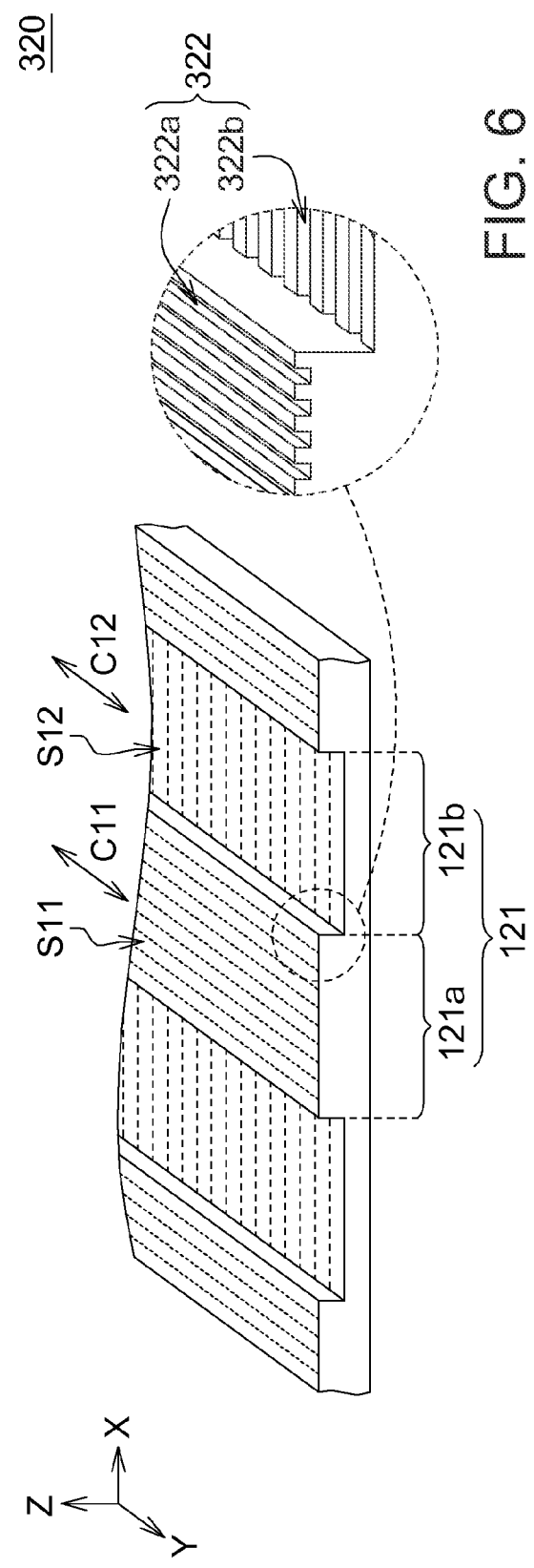
FIG. 6 shows a 3D diagram of the patterned resin layer of FIG. 5.

Referring to FIG. 5 and FIG. 6. FIG. 5 shows a schematic diagram of a patterned retardation film 300 of a third embodiment. FIG. 6 shows a 3D diagram of the patterned resin layer 320 of FIG. 5. The patterned retardation film 300 of the present embodiment of the invention is different from the patterned retardation film 100 of the first embodiment mainly in the aligning micron structure 322, and other similarities are not repeated.

As indicated in FIG. 6, the aligning micron structure 322 includes a plurality of first sub micron grooves 322a and a plurality of second sub micron grooves 322b. The first sub micron grooves 322a are formed on a top surface S11 of each first area 121a. The first sub micron grooves 322a are substantially parallel to the first extension direction C11 (such as the Y-axis direction of FIG. 6) of the first areas 121a. The second sub micron grooves 322b are formed on a bottom surface S12 of each second area 121b. The second sub micron grooves 322b are substantially interlaced and vertical to the second extension direction C12 (such as the Y-axis direction of FIG. 6) of the second areas 121b.

That is, the first sub micron grooves 322a and the second sub micron grooves 322b substantially form a contained angle of 90 degrees, and the liquid crystal molecules will be arranged at a 90° angular direction when being arranged in the first sub micron grooves 322a and the second sub micron grooves 322b.

Referring to FIG. 5, the liquid crystal layer 330 directly contacts the patterned resin layer 320, and is aligned with the aligning micron structure 322. The liquid crystal layer 330 of the present embodiment of the invention such as includes a liquid crystal material. When the light passes through the patterned retardation film 300, the liquid crystal layer 330 disposed above the first areas 121a provides a first phase retardation, and the liquid crystal layer 330 disposed above the second areas 121b provides a second phase retardation. The first phase retardation and the second phase retardation could be the same or not the same. Thus, the phase retardation generated by the patterned retardation film 300 can be applied in the 3D display technology.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A patterned retardation film, comprising:

a base substrate;

a patterned resin layer disposed on the base substrate, wherein the patterned resin layer has a plurality of first areas and a plurality of second areas, the combination of the first areas and the second areas are a grating-like stripe structure, the first areas are a relief-like stripe structure, the first areas are substantially interlaced and parallel to the second areas, and the patterned resin layer comprises:

an aligning micron structure disposed on a surface of the patterned resin layer, wherein the aligning micron structure comprises:

a plurality of first sub micron grooves formed on a top surface of each first area, wherein the first sub micron grooves are substantially parallel to a first extension direction of the first areas; and a plurality of second sub micron grooves formed on a bottom surface of each second area, wherein the second sub micron grooves are substantially parallel to a second extension direction of the second areas; and a liquid crystal layer disposed on the patterned resin layer and aligned with the aligning micron structure.

2. The patterned retardation film according to claim 1, wherein the width of each first area is substantially equal to the width of each second area.

3. The patterned retardation film according to claim 1, wherein the liquid crystal layer directly contacts the patterned resin layer.

4. The patterned retardation film according to claim 1, wherein the liquid crystal layer comprises a liquid crystal material.

5. The patterned retardation film according to claim 1, wherein the depth of each first sub micron groove is substantially the same with the depth of each second sub micron groove.

6. The patterned retardation film according to claim 1, wherein the width of each first sub micron groove, the interval between two adjacent first sub micron grooves, the width of each second sub micron groove, and the interval between two adjacent second sub micron grooves are substantially the same.

7. A patterned retardation film, comprising:
   a base substrate;
   a patterned resin layer disposed on the base substrate, wherein the patterned resin layer has a plurality of first areas and a plurality of second areas, the combination of the first areas and the second areas are a grating-like stripe structure, the first areas are a relief-like stripe structure, the first areas are substantially interlaced and parallel to the second areas, and the patterned resin layer comprises:
      an aligning micron structure disposed on a surface of the patterned resin layer, wherein the aligning microstructure comprises:
         a plurality of first sub micron grooves formed on a top surface of each first area, wherein the first sub micron grooves are substantially parallel to a first extension direction of the first areas; and
         a plurality of second sub micron grooves formed on a bottom surface of each second area, wherein the second sub micron grooves and a second extension direction of the second areas substantially form a 45° angle; and
   a liquid crystal layer disposed on the patterned resin layer and aligned with the aligning micron structure.

8. The patterned retardation film according to claim 7, further comprising:
   a ¼ wavelength retardation film disposed on the liquid crystal layer.

9. A patterned retardation film, comprising:
   a base substrate;
   a patterned resin layer disposed on the base substrate, wherein the patterned resin layer has a plurality of first areas and a plurality of second areas, the combination of the first areas and the second areas are a grating-like stripe structure, the first areas are a relief-like stripe structure, the first areas are substantially interlaced and parallel to the second areas, and the patterned resin layer comprises:
      an aligning micron structure disposed on a surface of the patterned resin layer, wherein the aligning micron structure comprises:
         a plurality of first sub micron grooves formed on a top surface of each first area, wherein the first sub micron grooves are substantially parallel to a first extension direction of the first areas; and
         a plurality of second sub micron grooves formed on a bottom surface of each second area, wherein the second sub micron grooves are substantially interlaced and vertical to a second extension direction of the second areas; and
   a liquid crystal layer disposed on the patterned resin layer and aligned with the aligning micron structure.

* * * * *